(12) United States Patent
Metzler (10) Patent No.: US 8,020,515 B2
(45) Date of Patent: Sep. 20, 2011

(54) FISH HABITAT

(76) Inventor: Brad Franklin Metzler, Gainesville, TX (US)

( * ) Notice: Subject to any disclaimer, the term of this patent is extended or adjusted under 35 U.S.C. 154(b) by 205 days.

(21) Appl. No.: 12/120,047

(22) Filed: May 13, 2008

(65) Prior Publication Data

US 2009/0283051 A1    Nov. 19, 2009

(51) Int. Cl.
*A01K 61/00* (2006.01)

(52) U.S. Cl. .......................... 119/221; 405/24

(58) Field of Classification Search .............. 119/200, 119/221, 209, 238; D30/101, 108, 199; 405/24, 405/25, 23
See application file for complete search history.

(56) References Cited

U.S. PATENT DOCUMENTS

| | | | |
|---|---|---|---|
| 2,141,484 A * | 12/1938 | Piglia ................................ | 47/30 |
| 3,118,424 A | 1/1964 | Willinger | |
| 3,286,391 A * | 11/1966 | Mengeringhausen ........ | 446/120 |
| 3,540,415 A | 11/1970 | Bromley | |
| 3,561,694 A | 2/1971 | Schuetz | |
| 3,933,124 A | 1/1976 | Ledoux et al. | |
| 3,953,949 A * | 5/1976 | O'Sheeran ........................ | 52/82 |
| 4,212,268 A | 7/1980 | Chapman | |
| 4,316,431 A | 2/1982 | Kimura | |
| 4,334,499 A | 6/1982 | Baass | |
| 4,441,453 A | 4/1984 | McMickle et al. | |
| 4,727,672 A | 3/1988 | Hill et al. | |
| 4,860,690 A | 8/1989 | De Santa et al. | |
| 4,913,094 A | 4/1990 | Jones et al. | |
| 4,916,845 A | 4/1990 | Aydelette, Sr. | |
| 4,947,791 A | 8/1990 | Laier et al. | |
| 4,993,362 A | 2/1991 | Jimbo | |
| 4,997,311 A * | 3/1991 | Van Doren ...................... | 405/30 |
| 5,173,006 A * | 12/1992 | Lowe ............................... | 405/25 |
| 5,272,829 A | 12/1993 | Roberts et al. | |
| 6,186,702 B1 * | 2/2001 | Bartkowski ..................... | 405/25 |
| 6,824,327 B1 * | 11/2004 | Walter ............................ | 405/33 |
| 7,513,711 B1 * | 4/2009 | Walter ............................ | 405/25 |

* cited by examiner

*Primary Examiner* — Rob Swiatek
*Assistant Examiner* — Ebony Evans
(74) *Attorney, Agent, or Firm* — John F. Booth; Booth Albanesi & Schroeder LLC (57) ABSTRACT

A fish habitat which provides a habitat for fish to congregate consisting of individual strands of a buoyant material, such as polyethylene, secured to a body for installation on the bed of a body of water.

27 Claims, 8 Drawing Sheets

POSSIBLE BODY CONFIGURATIONS

FIG. 7A

Panel Box -Large

FIG. 7B

Curved Dome

FIG. 7C

Panel Dome

FIG. 7D

Panel Cone

FIG. 7E

Curved Cone

FISH HABITAT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

BACKGROUND OF THE INVENTION

The present invention relates to a fish habitat suitable for use in fishing wherein the device can be submerged in bodies of fresh water or sea water. The fish habitat according to the invention, once submerged attracts fish and provides a habitat for them.

Fish habitats are known in the art. For example, U.S. Pat. No. 4,916,845 to Aydelette, Sr. describes a device that includes a plurality of spaced apart disks located on a shaft 28. The shaft includes an anchor at the bottom for maintaining the device on the floor of the river or lake. The anchor includes a perforated container for a weighting material and bait. A buoy is connected to the upper end of shaft 28 to locate the fish habitat.

U.S. Pat. No. 4,727,672 to Hill, et al. includes a stem member 44 and dependent leaf like structures 64. U.S. Pat. No. 5,272,829 to Roberts, et al. discloses a device which simulates a tree stump to provide a habitat for fish to congregate. The device includes an outer textured wall that resembles the bark on a tree trunk and an inner chamber secured to the outer textured wall. A structure for deploying the device within a body of water is secured to the inner chamber.

In addition to the above devices, there are numerous teachings in the art of artificial habitats, including artificial reefs. U.S. Pat. No. 3,933,124 (Ledoux, et al.), U.S. Pat. No. 4,212,268 (Chapman), U.S. Pat. No. 4,441,453 (McMickle, et al.) and U.S. Pat. No. 4,860,690 (De Santo, et al.) exemplify such structures. Ledoux, et al. create an artificial habitat by depositing helicoidal elements on the floor of the sea or fresh water body. Chapman discloses a totally artificial environment for small crustaceans. McMickle, et al. disclose a plurality of devices having individual strands of a buoyant material attached to an anchor. The devices are deposited on the bed of the water body to form a habitat. De Santo, et al. teach a marina dock and habitat dock located below a dock structure. Willinger, in U.S. Pat. No. 3,118,424, relates to a spawning device consisting of strands secured to a holding means and floatation means.

Artificial reefs for fish are also known. U.S. Pat. No. 4,334,499 to Baass uses a tire filled with concrete to form the artificial reef. U.S. Pat. No. 3,561,694 (Ishida), U.S. Pat. No. 4,316,431 (Kimura), U.S. Pat. No. 4,913,094 (Jones, et al.), U.S. Pat. No. 4,947,791 (Laier, et al.) and U.S. Pat. No. 4,993,362 (Jimbo) exemplify other artificial habitats. Some of these devices require exact placement of the habitat on the bed or floor of the water body. This necessitates the use of a diver who must enter the water and physically construct the habitat. This is time consuming and expensive.

A synthetic reef with flexible base material and elongated fronds is shown in Bromley U.S. Pat. No. 3,540,415. In that patent, the reef which is laid as a large connected mesh bed will not conform well to uneven lake bed topography. A further disadvantage is that the bed may lift and move about due to tidal and wave action, and the strands and bed may even be pulled out by anchors fouling in the base material. The anchor means for the synthetic reef comprises a plurality of weights which are dropped onto the submerged bed.

Other prior art habitats either lay unmoving as debris on the water bed or floor of the body or float on the surface, subject to degradation and damage through drift and winter freezing.

The fish habitat device of the present invention is lightweight, can be easily placed at a desired location and avoids the disadvantages of the fish habitat device of the prior art.

SUMMARY OF THE INVENTION

An artificial habitat for fish is provided, including individual strands of buoyant material connected to a body that may be weighted to the bottom or suspended at any depth. The loose ends of strands tend to float upward toward the surface. The strand length may be varied depending on the depth of water and the type of fish habitat desired.

The strands may be disposed at spaced intervals with respect to each other so as to provide the optimum arrangement for providing an environment for fish to congregate adjacent the structure. In a preferred design, the strands are formed from tubing, with each tube inserted into a chamfered hole in the body that wedges against the pipe as it is pushed into the body. Also, the tubing may be constructed of polyethylene having a density which allows it to float upward. Alternatively, the means for connecting the strands to the body may comprise a connector housing or receiver projecting outward or recessed into the body for frictionally retaining the strands so that the receivers wedge against the strands as they are pushed into the body.

The body may be cone-shaped or may be shaped with the exterior appearance of a small tree or shrub with a plurality of limbs radiating from the trunk. The cones may also be slotted to allow fish to enter the interior of the body. In another design, the body is dome-shaped and the tubes extend up from the dome base protecting and providing a habitat for baitfish. The dome shape may also include a portion to provide a natural area for fish to spawn in, e.g., a concave circular (saucer-shaped) depression centered in the shape.

The body preferably contains aperture as passageways for fluid, e.g., water, or air, therethrough when the device is placed in the body of water. The number and size of the aperture is sufficient to allow the device to sink to the floor of the water body. A ring eyelet or other structure may be located at the upper end of the body whereby a rope, chain, or cable can be attached to the device for positioning in a submerged state; the device can be weighted to the bottom of the lake, river, ocean, etc. or suspended at a particular depth.

Provision of a fish habitat using the present invention is cheaper than utilizing prior art concrete and wooden structures because a habitat according to the present invention is lightweight and easy to assemble. A further advantage is that the structure is constructed so that it substantially lessens fouling or impalement thereupon by hooks utilized by fishermen and can have lures fished therethrough without any hookups.

An additional object of the invention is to provide a structure that has abundant surface area for algae growth and egg attachment and also makes a large findable imprint on the bottom terrain.

Additional objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 8a illustrates an embodiment in which the body is dome-shaped (and slotted) and has a concave circular (saucer-shaped) depression centered in the shape for fish to spawn in; FIG. 8b is a cross-section view of the embodiment of FIG. 8a.

DETAILED DESCRIPTION OF THE INVENTION

Figure 1:
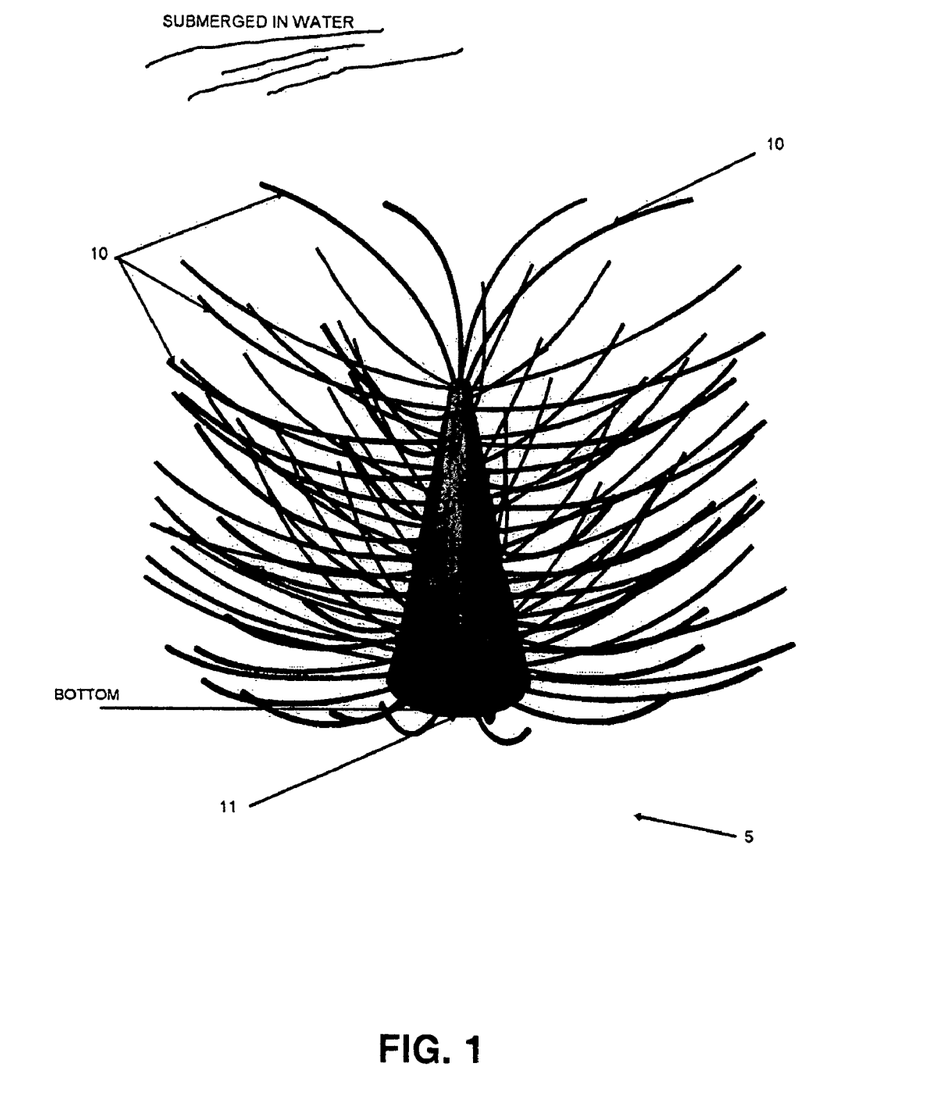
FIGS. 1 and 2 illustrate a typical fish habitat according to one embodiment of the invention.
Figure 2:
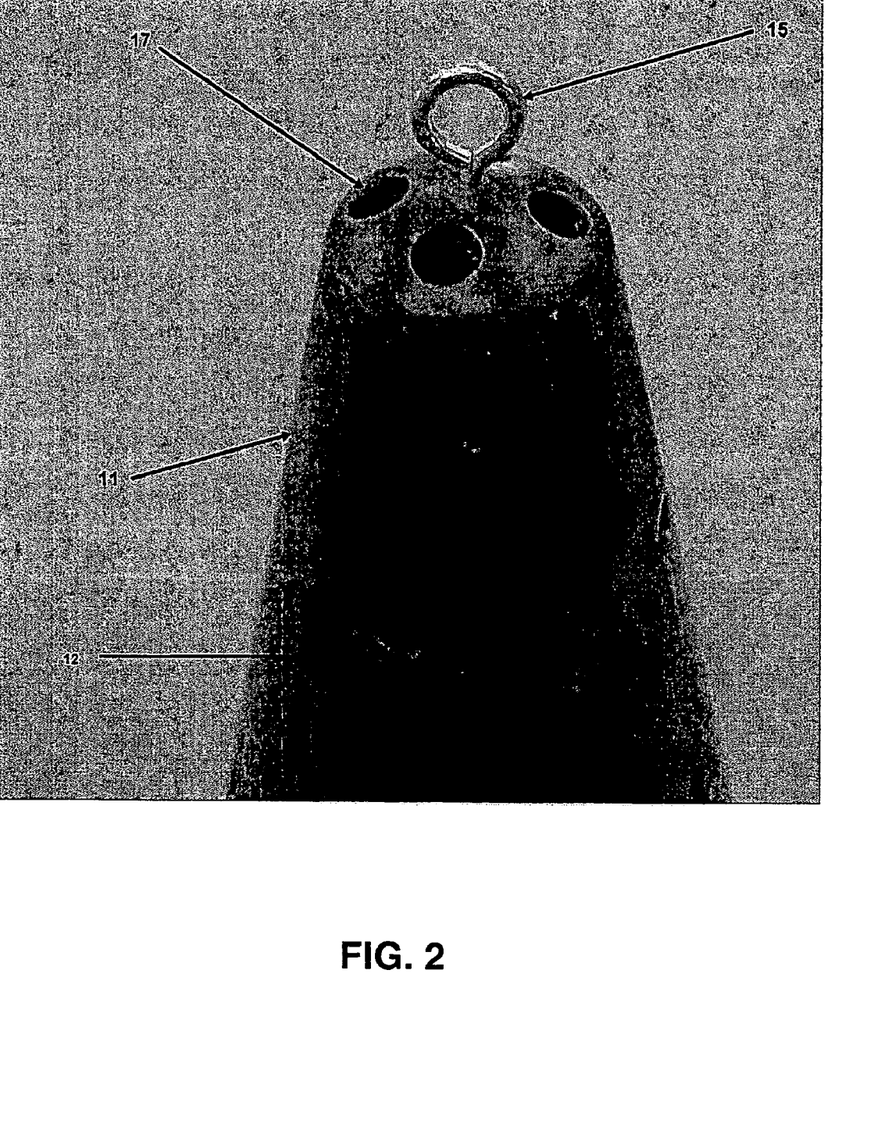

FIGS. 1 and 2 illustrate a cone shaped habitat element 5. In FIG. 2 the cone shaped body 11 is shown before installation of the strands 10. Strands 10 are constructed of one or a combination of materials such that at least some of the strands 10 are buoyant in water. Polyethylene is a preferred material due to its inherent floatability and water imperviousness. Other materials with densities greater than water can be used to form the strands by foaming with gas, mixing with less dense materials or other means. The strands 10 may be solid, hollow, round, oval, flat or slit films when the material chosen to form the strands provides the desired density needed for floatation. Preferably, flexible strands are used so that the strands can move with the water. The strands preferably have a deformable cross section for mounting. The length may vary from a few inches for shallow water applications to 30 feet or more if it is desired to create a habitat in deep bodies of water. The only length limitation is on the planned usage depth and that the strands 10 should remain below the ice level in areas where lakes are subject to freezing.

The strands 10 are secured to generally cone-shaped body 11, at spaced intervals with respect to each other so as to provide the optimum arrangement for causing fish to congregate adjacent the structure.

The body 11 may be made using a molded shape (cone, dome, etc.), such as obtained through roto-casting, injection molded, vacuum forming or other methods as will be described in the body could also be made by using an arrangement of flat panels that connected to form a shape (box, pyramid, etc.) to define the body. HD 8660 manufactured by the ExxonMobil Chemical Company, Houston, Tex., and Marlex® HMN TR-938 and HMN TR-938G manufactured by the Chevron Phillips Chemical Company LP, The Woodlands, Tex. have been found to be ideal materials for making the body. Plastic coated weights (not shown) of sand, metal or any suitable material having a density sufficient to overcome the buoyancy of the strands 10 may be attached to body 11 in any suitable manner for maintaining the structure 5 in a submerged state, e.g., so it can be weighted to rest on the lake bed 14 or suspended at a particular depth. As shown in FIG. 2, body 11 may include through-holes or aperture 17 (to allow water or other fluids to pass them through) and a ring structure 15 at its upper end. Ring structure 15 includes an aperture through which a rope or similar device (not shown) is placed to position the fish habitat at the desired location.

Figure 3:
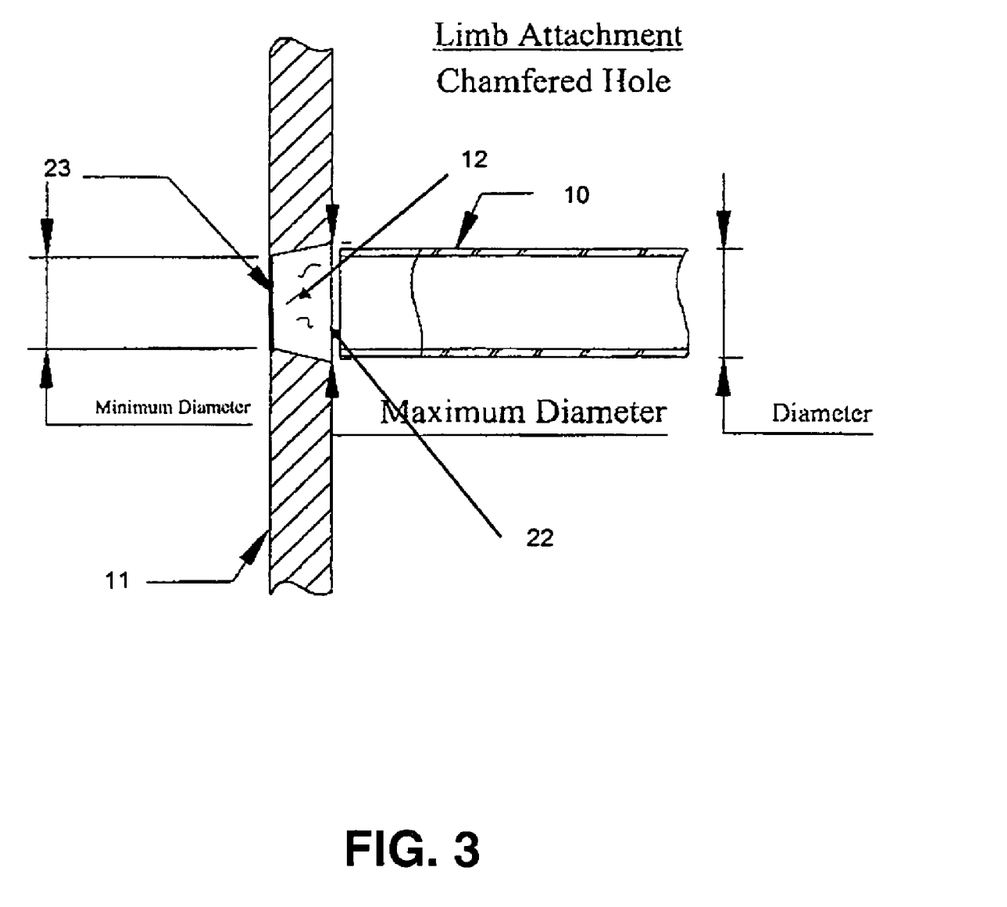
FIG. 3 is a partial sectional view or a chamfered hole in the body for frictionally retaining the strands.

In FIG. 3, chamfered holes 12 with the large aperture of the chamfered holes facing outward are formed in the body 11 to provide an insertion point for each of the strands 10. In this illustration, the diameter at the outer edge 22 of the holes 12 is approximately equal to or greater than the diameter of strand 10. The diameter at the inner edge 23 of the holes 12 is selected to be less than the strand diameter. These holes 12 wedge against (constrict around) and frictionally engage the tubing 10 as it is pushed into the body 11 to maintain the strands in place. The chamfered holes also allow more movement by the strands. Other shapes could also be used for the strands (and the holes 12) where the maximum cross-sectional area of the holes is equal to or greater than the cross-sectional area of the strand at the insertion points, and the minimum cross-sectional area of the hole at the trailing edge is less than the cross-sectional area of the strands so that a force fit is provided. Another example would be where the strand, although of larger diameter, is deformable to force fit and frictionally engage in holes of lesser diameter. This configuration need not provide a sealing connection which may be desirable so that water or other fluids can pass therethrough, e.g. when the device is placed in the body of water.

Figure 4:
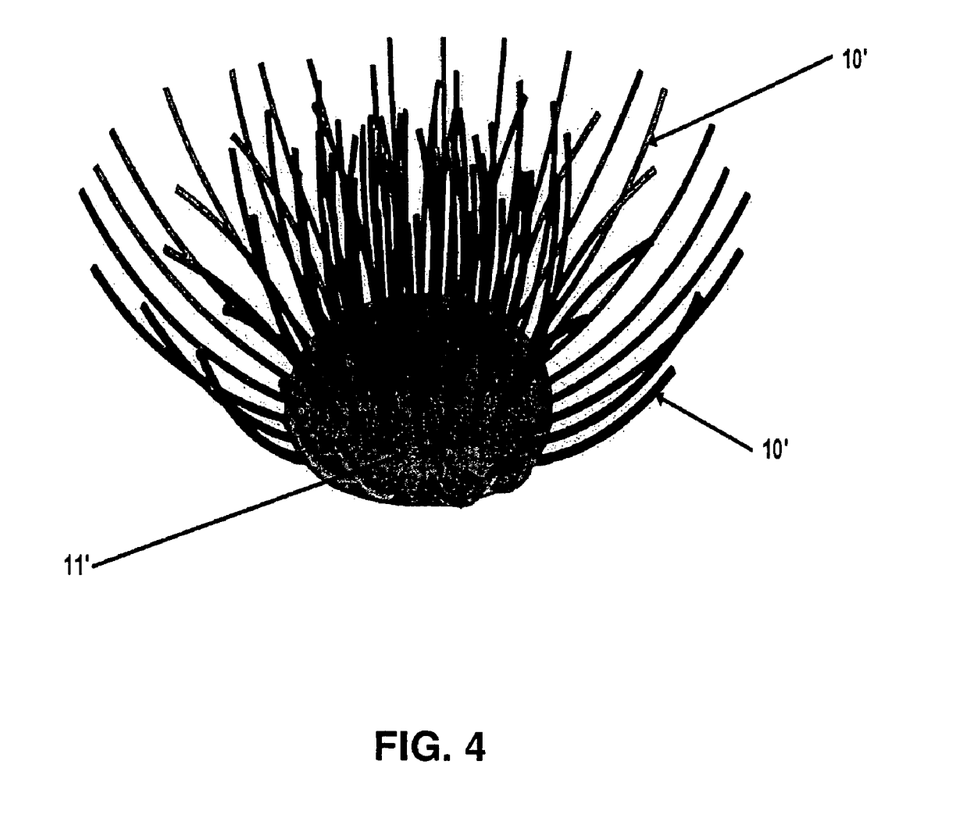
FIG. 4 illustrates a fish habitat in accordance with a second embodiment of the present invention.

A second embodiment of the fish habitat of the instant invention is shown in FIG. 4. In FIG. 4, the body 11' is dome-shaped and the tubes 10' spring up from the dome base protecting and providing a spawning habitat for baitfish. In another embodiment (not shown), the strands are relatively rigid in cross-section while the body material is relatively deformable. When the body is flexible, the strands can be rigid and still move so that the strands can bend allowing the strands to have greater movement with wave or water currents.

Figure 5A:
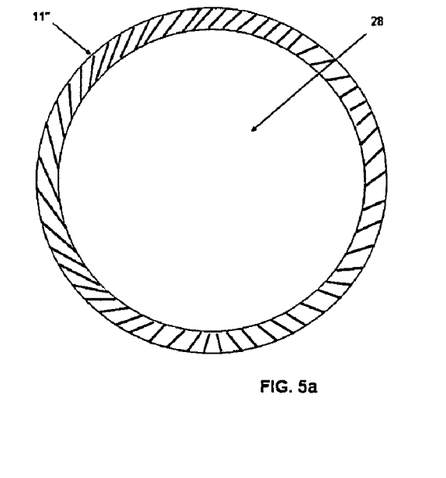
FIGS. 5a-5c illustrate an embodiment in which the cones are slotted (FIG. 5c is a partial cross-sectional view)
Figure 5B:
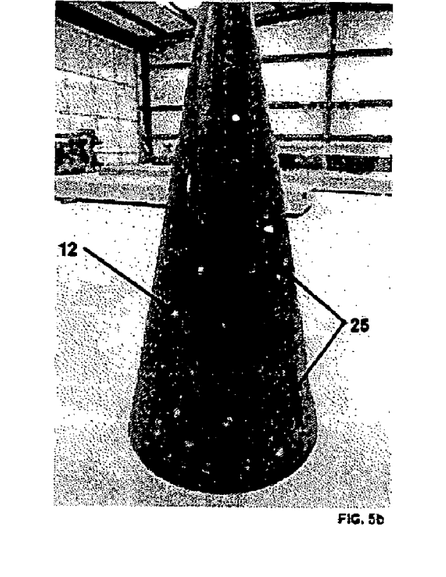
Figure 5C:
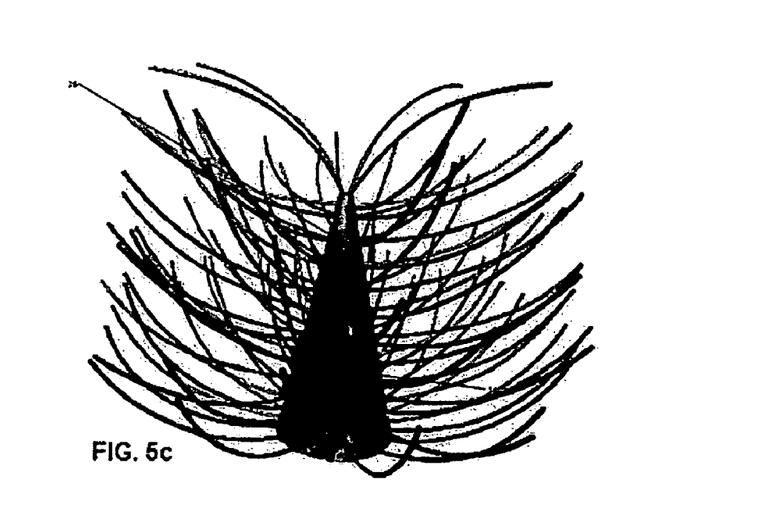

FIGS. 5a-5c show an embodiment in which the cones 11' are slotted at 25 to allow fish to enter the habitat, and the cone has a hollow interior portion 28 to provide a housing compartment for sheltering fish; in the example shown, the 12 slots are 1.75"×5.75" and are placed in a random pattern on the cone.

Figure 6A:
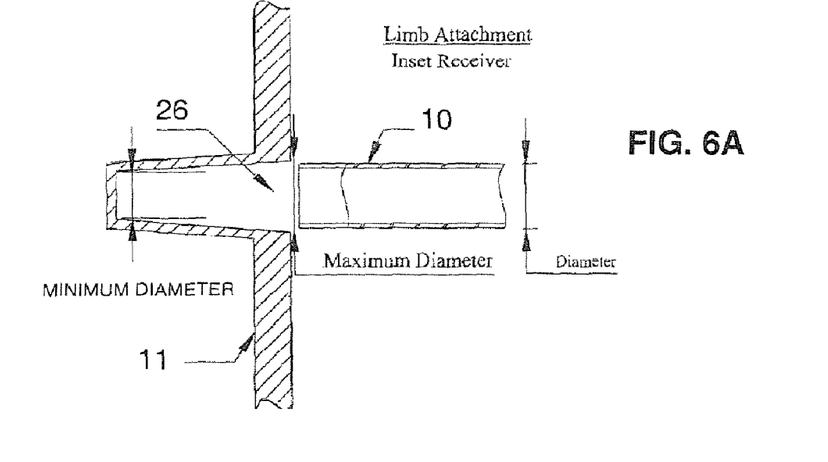
FIGS. 6a-6b are cross-sectional views illustrating sample options for the limb attachment means.
Figure 6B:
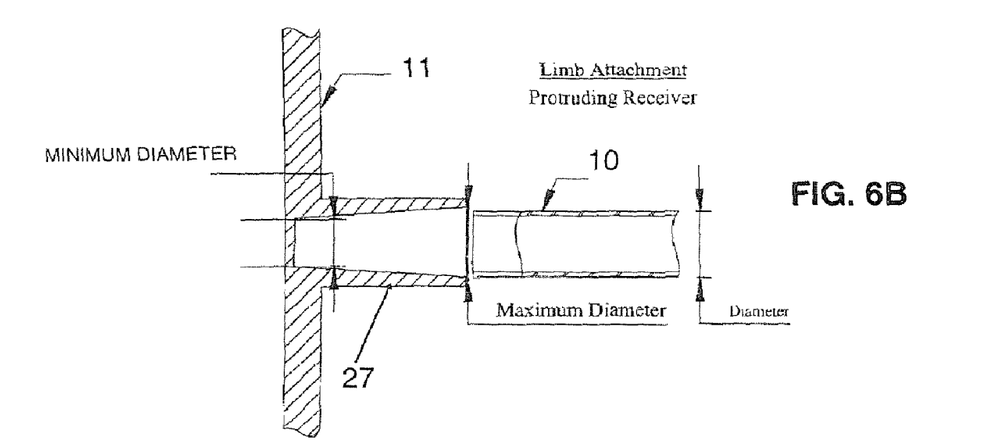
Figure 7A:
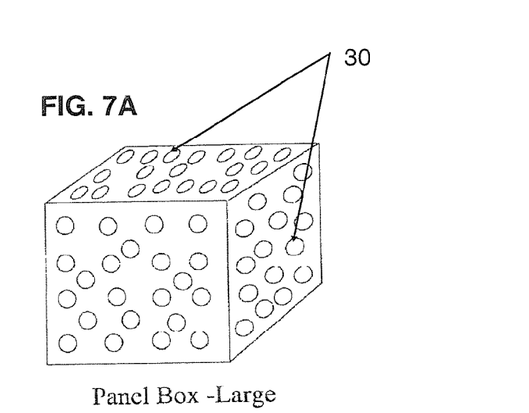
FIGS. 7a-7e illustrate sample configurations wherein the device is made by using an arrangement of generally flat panels connected to form a shape (box, pyramid, etc.)
Figure 7B:
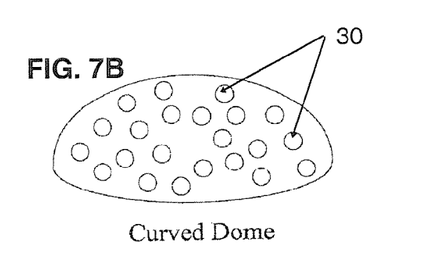
Figure 7C:
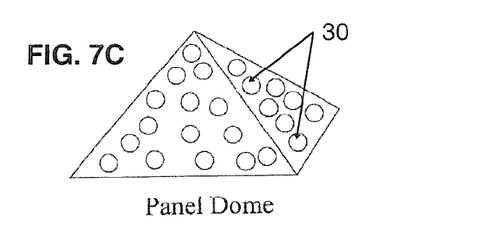
Figure 7D:
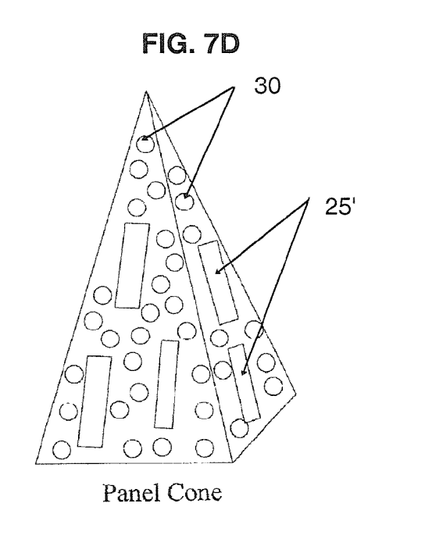
Figure 7E:
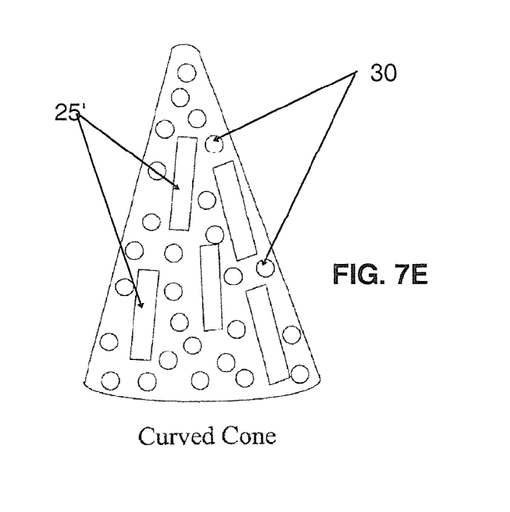

FIGS. 6a-6b show sample options for the limb attachment means, including inset receiver 26 (FIG. 6a) and protruding receiver 27 (FIG. 6b), adapted to receive the strands 10 and provide a force fit for frictionally retaining the strands. In FIGS. 6a and 6b the maximum diameter of receivers 26 and 27 is equal to or greater than the diameter of strand 10, while the minimum diameter is less than the strand diameter.

FIGS. 7a-7e show possible embodiments (before installation of the strands 10) in which the body is made by using an arrangement of flat panels connectable to form a three-dimensional shape (box, pyramid, etc.) to define the body; as shown, the body may be slotted with slots 25' (FIGS. 7d-7e) and includes holes or aperture 30 to provide an insertion point for the strands 10; this configuration may be found advantageous for packing and shipping the device to customers.

Figure 8A:
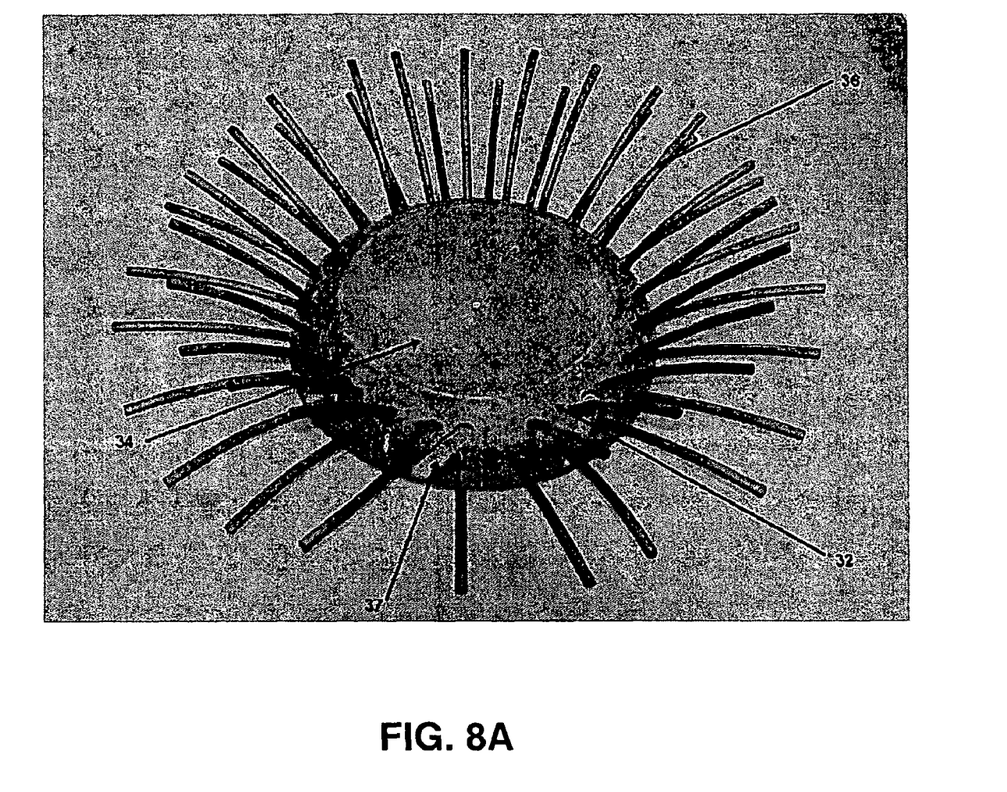
Figure 8B:
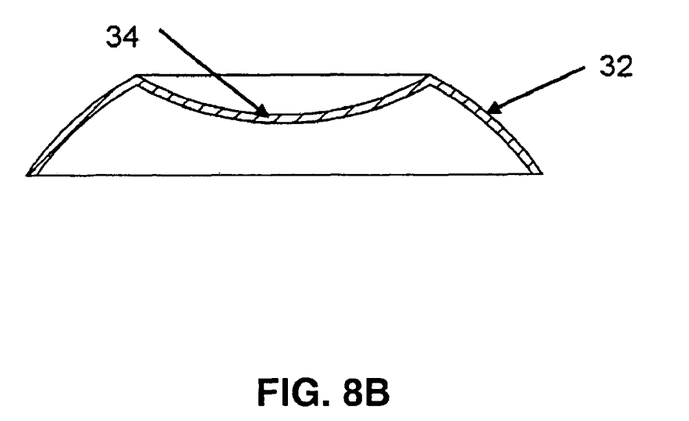

FIGS. 8a-8b show an embodiment in which the body 32 is dome-shaped and slotted at 37 (with tubes 36 extending from the dome base), and includes a concave depression 34 in the shape to provide a natural area for fish to spawn in (as shown, the depression is circular and centered in the shape, but is not limited to this arrangement).

The fish habitat according to the instant invention can be used in the following exemplary manner. The first step is selecting an appropriate location in a stream or lake for the placement of the fish habitat device of the invention. After the selection is made, the fish habitat or devices are loaded into the boat and transported to the desired location. If desired the weighting material (not shown) can be attached to the device prior to placement in the water. Next, the device is lowered into the water. In a preferred orientation, a grouping of at least three or more of the fish habitat devices are placed on the bottom in water at least 6' deep to attract gamefish such as bass or crappie. These types of fish are attracted to cover that is fairly dense, but also allows free movement to ambush prey.

In an alternative embodiment of the invention, a preferred orientation is to place the device in shallow water of 2' to 3' deep to provide escape cover for juvenile baitfish and a breeding ground for plankton, insects and forage fish.

In considering this invention, it should be remembered that the present disclosure is illustrative only, and the scope of the invention should be determined by the appended claims.

What is claimed is:

1. A fish habitat comprising:
a cone shaped body comprising a wall portion forming an interior chamber;
a plurality of buoyant tubular strands, each strand having an outer diameter at one end; and
means on said body for frictionally engaging the one end of said strands to connect said strands to the body, said engaging means comprising tapered holes in said wall portion, said holes having a minimum internal diameter which is less than the one end outer diameter of the strands and a maximum internal diameter which is greater than the one end outer diameter of the strands.

2. The fish habitat of claim 1 wherein the body is made from plastic material.

3. The fish habitat of claim 1 wherein the body has at least one aperture for passing fluid therethrough.

4. The fish habitat of claim 1 further including means on the body for detachable connection to a lowering device.

5. The fish habitat of claim 1 wherein said strands have deformable cross sections.

6. The fish habitat of claim 5 wherein said strands are hollow.

7. A fish habitat of claim 6 in which the strands are circular in cross section.

8. The fish habitat of claim 1 wherein said strands are placed at spaced intervals with respect to each other.

9. The fish habitat of claim 1 wherein the holes vary in cross-sectional size along their length.

10. The fish habitat of claim 1 wherein the strands are of a cross section to form an interference fit with the hole.

11. The fish habitat of claim 1 additionally comprises an anchor connected to said body for holding said habitat submerged in a body of water.

12. The fish habitat of claim 1 wherein said body has an interior chamber for sheltering fish and aperture for allowing fish to enter the housing interior chamber.

13. The fish habitat of claim 12, additionally comprising an inset in the body.

14. The fish habitat of claim 12, additionally comprising a receiving means protruding from the body.

15. The fish habitat of claim 1 wherein said engaging means includes receiving means for frictionally retaining the strands removably in place.

16. The fish habitat of claim 1 wherein the strands are relatively rigid in cross section while the body material is relatively deformable, allowing the strands to move with the water currents.

17. The fish habitat of claim 1 wherein the body comprises a curved cone.

18. The fish habitat of claim 1 wherein the body comprises a panel cone.

19. The fish habitat of claim 1 wherein the body comprises a plurality of panels joined together along adjacent edges.

20. The fish habitat of claim 1 wherein the body is made from a plurality of generally flat panels connected together to form the body shape.

21. The fish habitat of claim 1 wherein the body is molded.

22. The fish habitat of claim 21 wherein the molded body is roto-molding.

23. The fish habitat of claim 1 wherein the molded body is vacuum formed.

24. The fish habitat of claim 1 wherein the body is injection molded.

25. A fish habitat comprising: a dome shaped body comprising a wall portion forming an interior chamber;
a plurality of buoyant tubular strands, each strand having an outer diameter at one end; and
means on said body for frictionally engaging the one end of said strands to connect said strands to the body, said engaging means comprising tapered holes in said wall portion, said holes having a minimum internal diameter which is less than the one end outer diameter of the strands and a maximum internal diameter which is greater than the one end outer diameter of the strands.

26. The fish habitat of claim 25 wherein said body has a depression of a size to allow fish to use as a spawning area.

27. The fish habitat of claim 25 wherein said body comprises a plurality of panels joined together along adjacent edges.

* * * * *